No. 647,069. Patented Apr. 10, 1900.
H. A. BERGOM.
COMBINED SPADER AND PULVERIZER.
(Application filed Mar. 4, 1899.)
(No Model.)
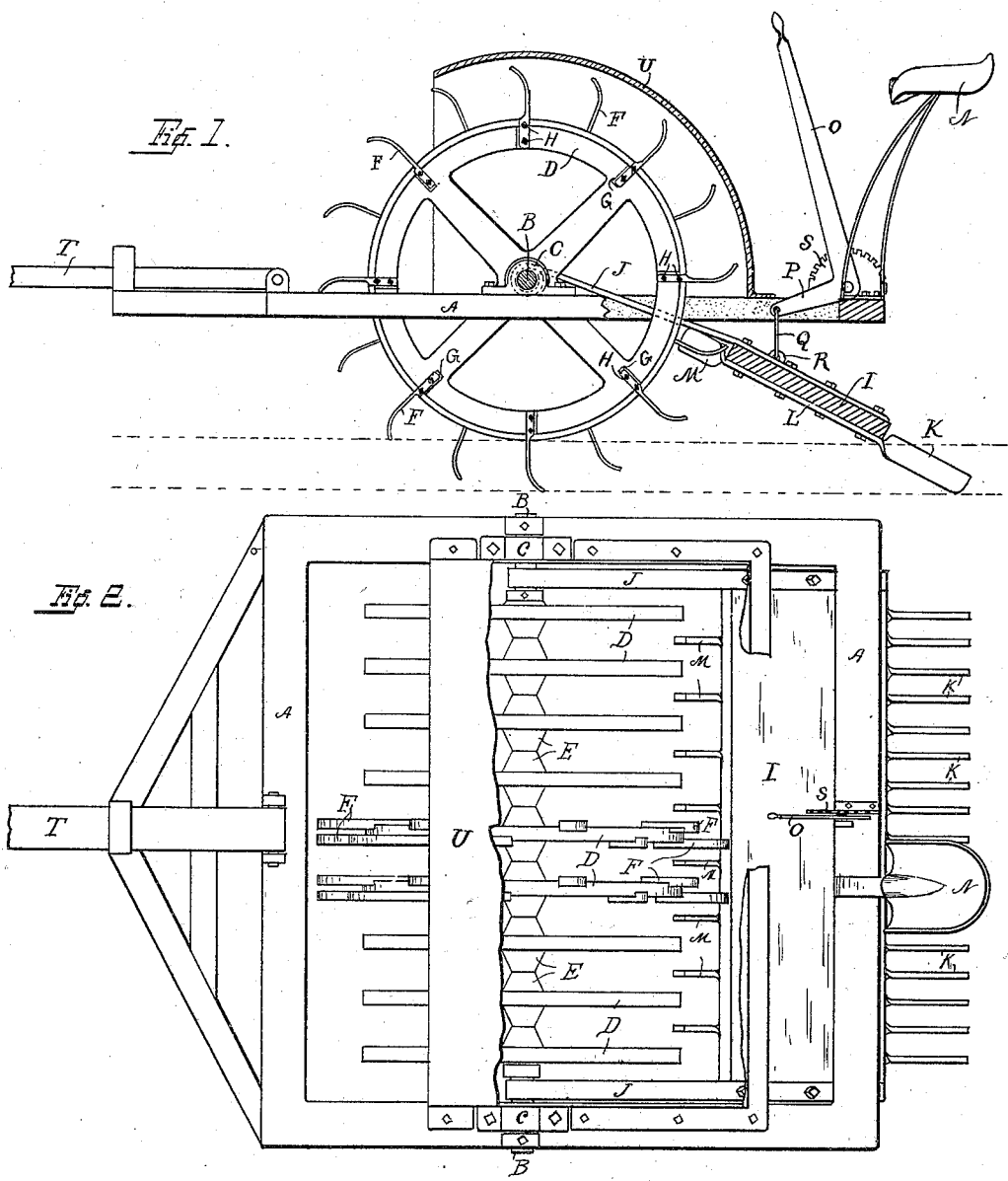
Witnesses. Inventor.
Hans A. Bergom
By Erwin Wheeler & Wheeler,
Attorney.

UNITED STATES PATENT OFFICE.

HANS A. BERGOM, OF STOUGHTON, WISCONSIN.

COMBINED SPADER AND PULVERIZER.

SPECIFICATION forming part of Letters Patent No. 647,069, dated April 10, 1900.

Application filed March 4, 1899. Serial No. 707,814. (No model.)

*To all whom it may concern:*

Be it known that I, HANS A. BERGOM, a citizen of the United States, residing at Stoughton, in the county of Dane and State of Wisconsin, have invented new and useful Improvements in a Combined Spader and Pulverizer, of which the following is a specification.

My invention relates to improvements in combined spaders and pulverizers.

The object of my invention is to provide a form of harrow which will effectually loosen the soil for a considerable depth and thoroughly pulverize the same.

In the following description reference is had to the accompanying drawings, in which—

Figure 1 is a side elevation of my invention with a portion of one of the frame-bars broken away. Fig. 2 is a plan view of the same.

Like parts are identified by the same reference-letters in both views.

A frame A is provided with a shaft B, journaled in bearings C and provided with a series of wheels or disks D, which are preferably independently revoluble. The wheels D are provided with hubs E, which keep them properly spaced at equal distances from each other. Each of the wheels is also provided with a series of teeth F, which are secured alternately to bearing-shoulders G on the respective sides of the wheels. The inner ends of these teeth are angularly formed, so as to fit said shoulders, to which they are secured by bolts H, and the outer or free ends of the teeth are preferably curved in the direction of movement, so as to lift the soil into which they are driven, as shown in Fig. 1. In the rear of the wheels D, I have provided an inclined crushing-plank I, which may be secured to any convenient point on the frame or to the shaft B, with which it is preferably connected by means of bars J. Pulverizing-knives K are secured to the plank by means of shanks L, the latter being extended across the plank and into the space between the teeth F, as indicated at M in Fig. 1, whereby any clods or other material carried upwardly by the teeth F will be removed. It will also be observed that I have provided a frame with a seat N, which may be occupied by the driver and from which the position of the crushing-plank I and pulverizing-knives K may be controlled by means of the lever O, arm P, and link Q, the latter being secured to the crushing-plank at R.

S is a toothed sector which permits the lever to be locked in any desired position of adjustment, the lever being provided with a catch, (not shown in the drawings,) of any ordinary construction, adapted to engage the teeth of the sector.

The device is drawn by means of a tongue T, and as the teeth are successively pressed into the surface of the soil the forward movement of the machine causes them to pry the soil upwardly in much the same manner as where an ordinary spade is used, the lumps being then crushed by the plank I and the clods, pieces of sod, roots, &c., cut by the knives K.

The teeth are preferably covered by a shield U in front of the driver's seat in order to prevent accidents.

Having thus described my invention, what I claim as new, and desire to secure by Letters Patent, is—

In a combined spader and pulverizer, provided with rotary disks and spading-teeth; a crushing-plank suspended in the rear of the disks; and bars secured transversely of the plank on the under side thereof, with their rear ends formed into trailing, pulverizing knives, and their front ends formed into guards, projecting between the spading-teeth, substantially for the purpose set forth.

In testimony whereof I have hereunto set my hand this 15th day of February, 1899.

HANS A. BERGOM.

Witnesses:
JAS. B. ERWIN,
LEVERETT C. WHEELER.